US010625152B2

(12) United States Patent
Biheller

(10) Patent No.: US 10,625,152 B2
(45) Date of Patent: Apr. 21, 2020

(54) CONTROLLERS WITH MOVEABLE ACTUATORS

(71) Applicant: Bensussen Deutsch & Associates, LLC, Woodinville, WA (US)

(72) Inventor: Jason Biheller, Woodinville, WA (US)

(73) Assignee: Bensussen Deutsch & Associates, LLC, Woodinville, WA (US)

( * ) Notice: Subject to any disclaimer, the term of this patent is extended or adjusted under 35 U.S.C. 154(b) by 108 days.

(21) Appl. No.: 15/862,540

(22) Filed: Jan. 4, 2018

(65) Prior Publication Data

US 2018/0185748 A1 Jul. 5, 2018

Related U.S. Application Data

(60) Provisional application No. 62/449,986, filed on Jan. 24, 2017, provisional application No. 62/442,884, filed on Jan. 5, 2017.

(51) Int. Cl.
*A63F 13/24* (2014.01)
*A63F 13/23* (2014.01)
*A63F 13/98* (2014.01)

(52) U.S. Cl.
CPC .............. *A63F 13/23* (2014.09); *A63F 13/24* (2014.09); *A63F 13/98* (2014.09); *A63F 2300/1043* (2013.01)

(58) Field of Classification Search
CPC .......... A63F 13/02; A63F 13/20; A63F 13/21; A63F 13/24; A63F 13/90; A63F 13/98; A63F 2300/1006; A63F 2300/1043
See application file for complete search history.

(56) References Cited

U.S. PATENT DOCUMENTS

| 7,758,424 | B2 | 7/2010 | Riggs et al. |
| 7,775,884 | B1 | 8/2010 | McCauley et al. |
| D667,892 | S | 9/2012 | Burgess et al. |
| 8,352,229 | B1 | 1/2013 | Ma et al. |
| 8,480,491 | B2 | 7/2013 | Burgess et al. |
| 8,641,525 | B2 | 2/2014 | Burgess et al. |
| D721,139 | S | 1/2015 | Burgess et al. |
| D728,030 | S | 4/2015 | Burgess et al. |
| D730,451 | S | 5/2015 | Burgess et al. |

(Continued)

FOREIGN PATENT DOCUMENTS

EP 3 053 635 A1 8/2016
WO 2014/051515 A1 4/2014

(Continued)

OTHER PUBLICATIONS

International Search Report, dated Mar. 29, 2018, for International Application No. PCT/US2018/012422, 6 pages.

(Continued)

*Primary Examiner* — Lawrence S Galka
(74) *Attorney, Agent, or Firm* — Seed Intellectual Property Law Group LLP

(57) ABSTRACT

A controller can include a controller body having a cavity disposed in a back side of the controller body, a module member that is physically distinct and separate from the controller body removably coupleable to the controller body, the module member having a body sized and shaped to be received in the cavity, and at least one actuator that protrudes from a side of the member body.

19 Claims, 9 Drawing Sheets

(56) References Cited

U.S. PATENT DOCUMENTS

| | | | |
|---|---|---|---|
| D733,802 S | 7/2015 | Burgess et al. | |
| 9,089,770 B2 | 7/2015 | Burgess et al. | |
| D748,734 S | 2/2016 | Burgess et al. | |
| 9,289,688 B2 | 3/2016 | Burgess et al. | |
| 9,308,450 B2 | 4/2016 | Burgess et al. | |
| 9,308,451 B2 | 4/2016 | Burgess et al. | |
| 9,352,229 B2 | 5/2016 | Burgess et al. | |
| 9,492,744 B2 | 11/2016 | Burgess et al. | |
| 9,533,219 B2 | 1/2017 | Burgess et al. | |
| 2002/0052237 A1 | 5/2002 | Magill | |
| 2002/0128064 A1 | 9/2002 | Sobota | |
| 2005/0255918 A1 | 11/2005 | Riggs et al. | |
| 2006/0025217 A1* | 2/2006 | Hussaini | A63F 13/24 463/36 |
| 2007/0052177 A1* | 3/2007 | Ikeda | A63F 13/24 273/317 |
| 2009/0054146 A1* | 2/2009 | Epstein | A63F 13/06 463/38 |
| 2012/0142419 A1* | 6/2012 | Muramatsu | A63F 13/24 463/37 |
| 2015/0238855 A1* | 8/2015 | Uy | G06F 3/0338 463/37 |
| 2015/0297993 A1 | 10/2015 | Burgess et al. | |
| 2015/0297994 A1 | 10/2015 | Burgess et al. | |
| 2015/0321093 A1* | 11/2015 | Burgess | A63F 13/02 463/37 |
| 2016/0082349 A1 | 3/2016 | Burgess et al. | |
| 2016/0193529 A1 | 7/2016 | Burgess et al. | |
| 2016/0228765 A1* | 8/2016 | Rubio | A63F 13/24 |
| 2016/0296837 A1 | 10/2016 | Burgess et al. | |
| 2016/0317918 A1* | 11/2016 | Gassoway | A63F 13/24 |
| 2016/0346682 A1* | 12/2016 | Burgess | A63F 13/24 |
| 2018/0178133 A1* | 6/2018 | Ironmonger | A63F 13/24 |

FOREIGN PATENT DOCUMENTS

| | | |
|---|---|---|
| WO | 2015/118082 A2 | 8/2015 |
| WO | 2016/176003 A1 | 11/2016 |
| WO | 2016/176012 A1 | 11/2016 |

OTHER PUBLICATIONS

Written Opinion, dated Mar. 29, 2018, for International Application No. PCT/US2018/012422, 7 pages.

International Preliminary Report on Patentability for PCT/US2018/012422, dated Jul. 18, 2019. 8 pages.

* cited by examiner

CONTROLLERS WITH MOVEABLE ACTUATORS

CROSS-REFERENCE TO RELATED APPLICATIONS

This application claims the benefit under 35 U.S.C. § 119(e) of U.S. Provisional Patent Application No. 62/442,884, filed Jan. 5, 2017, and U.S. Provisional Patent Application No. 62/449,986, filed Jan. 24, 2017, which are incorporated herein by reference in their entirety.

BACKGROUND

Technical Field

The present disclosure is related to controllers and, more particularly, to controllers with moveable actuators.

Description of the Related Art

Conventional controllers are generally limited in the flexibility accorded to users to customize use of various input mechanisms, which receive physical input from a user that is translated to a corresponding output, e.g., control of an on-screen function. For example, in the context of video game consoles and other video game processor systems, e.g., laptops, mobile phones, personal computers, etc.), a controller is coupled to the video game consoles and other video game processor systems such that the controller can control an on-screen function of a video game. The controller can comprise various handheld game controllers which can include various input devices, such as joysticks, digital sticks, directional pads, steering wheels, etc. It is desirable to provide customization options to users that may improve ergonomic and flexibility needs of users.

BRIEF SUMMARY

In an implementation, a controller can be summarized as including a controller body having a cavity disposed in a back side of the controller body, a module member that is physically distinct and separate from the controller body removably coupleable to the controller body, the module member having a body sized and shaped to be received in the cavity, and at least one actuator that protrudes from a side of the member body.

In an implementation, a controller can be summarized as including a controller body and a module member that is physically separate and distinct from the controller body. The module member is removably coupled to the controller body and can include a module member body, a first pair of levers that protrude outwardly from a first side of the module member body, a second pair of levers that protrude outwardly from a second side of the module member body, and a processor disposed in the module member body and coupleable to the first and second pair of levers.

In an implementation, a controller can be summarized as including a controller body, and one or more actuators removably coupled to the controller body, movement of the one or more actuators controlling an on-screen function.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with controllers have not been shown or described in detail to avoid unnecessarily obscuring descriptions of the implementations.

Unless the context requires otherwise, throughout the specification and claims which follow, the word "comprise" and variations thereof, such as "comprises" and "comprising," are to be construed in an open, inclusive sense, that is as "including, but not limited to."

Reference throughout this specification to "one implementation" or "an implementation" means that a particular feature, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Figure 1:
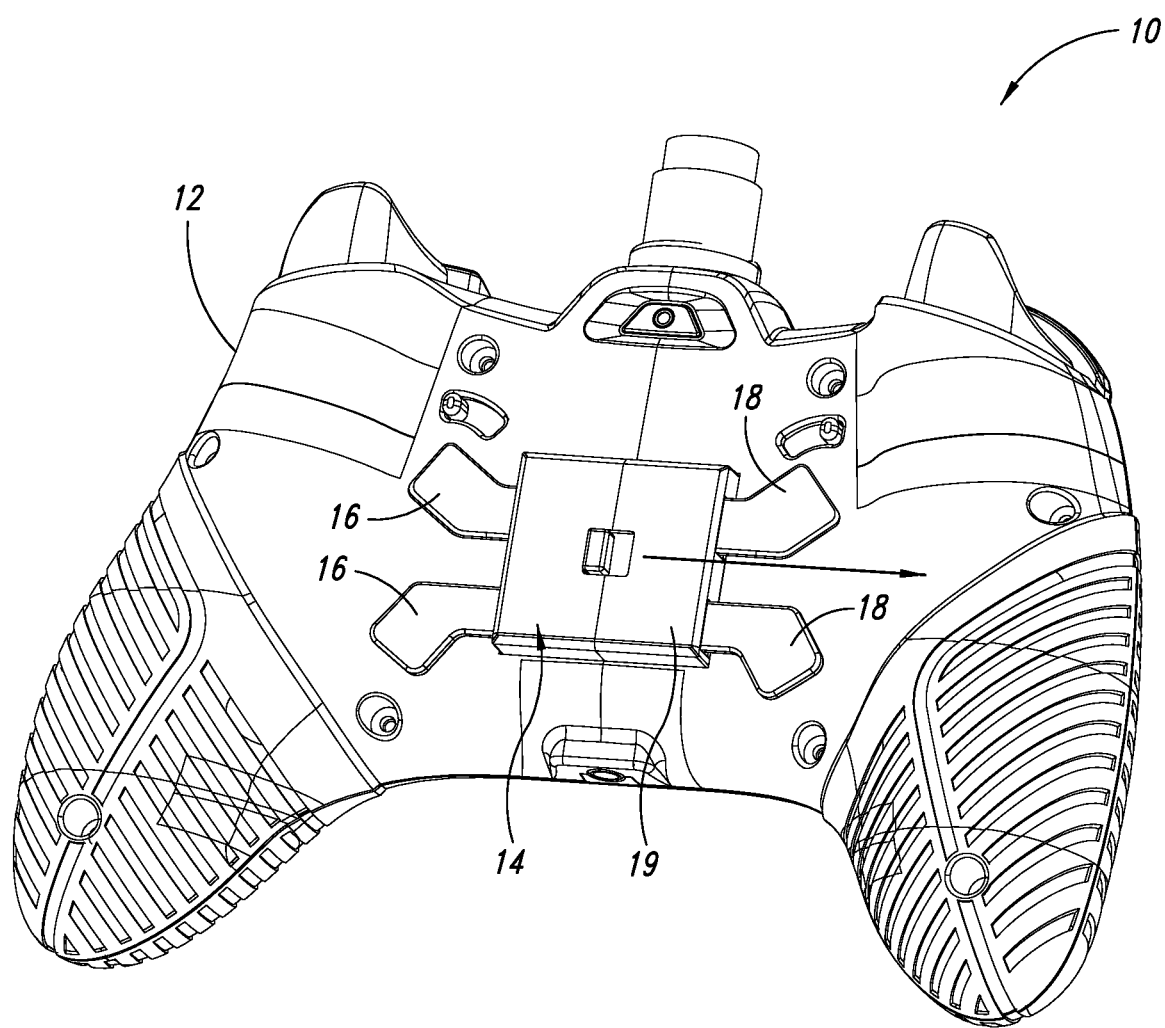
FIG. 1 illustrates a rear perspective view of a controller, according to one example, non-limiting implementation.
Figure 2A:
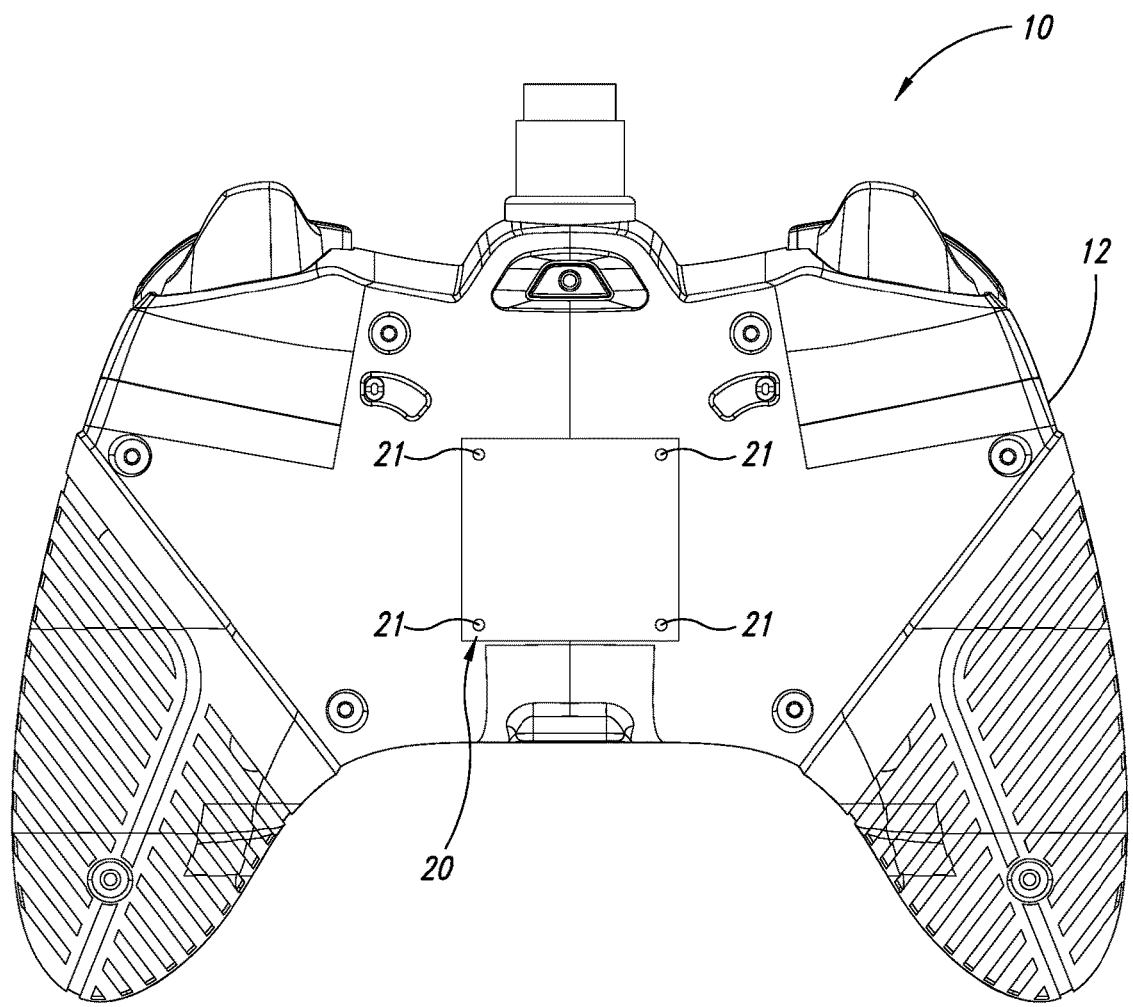
FIG. 2A illustrates a rear plan view of a controller body of the controller of FIG. 1, according to one example, non-limiting implementation.
Figure 2B:
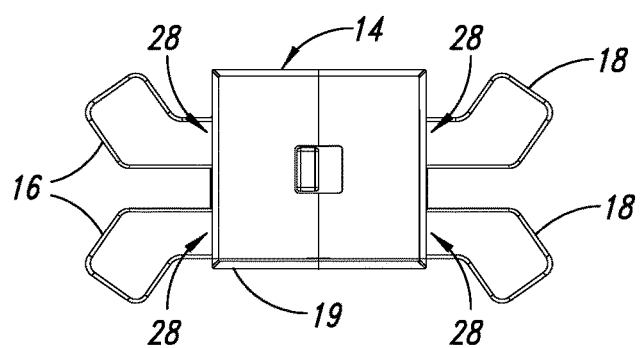
FIG. 2B illustrates a front plan view of a module member of the controller of FIG. 1, according to one example, non-limiting implementation.
Figure 2C:
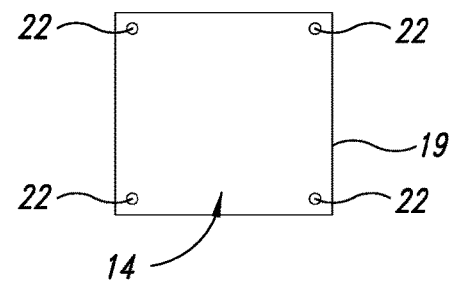
FIG. 2C illustrates a rear plan view of the module member of the controller of FIG. 1, with certain components removed for clarity of illustration and description.
Figure 3:
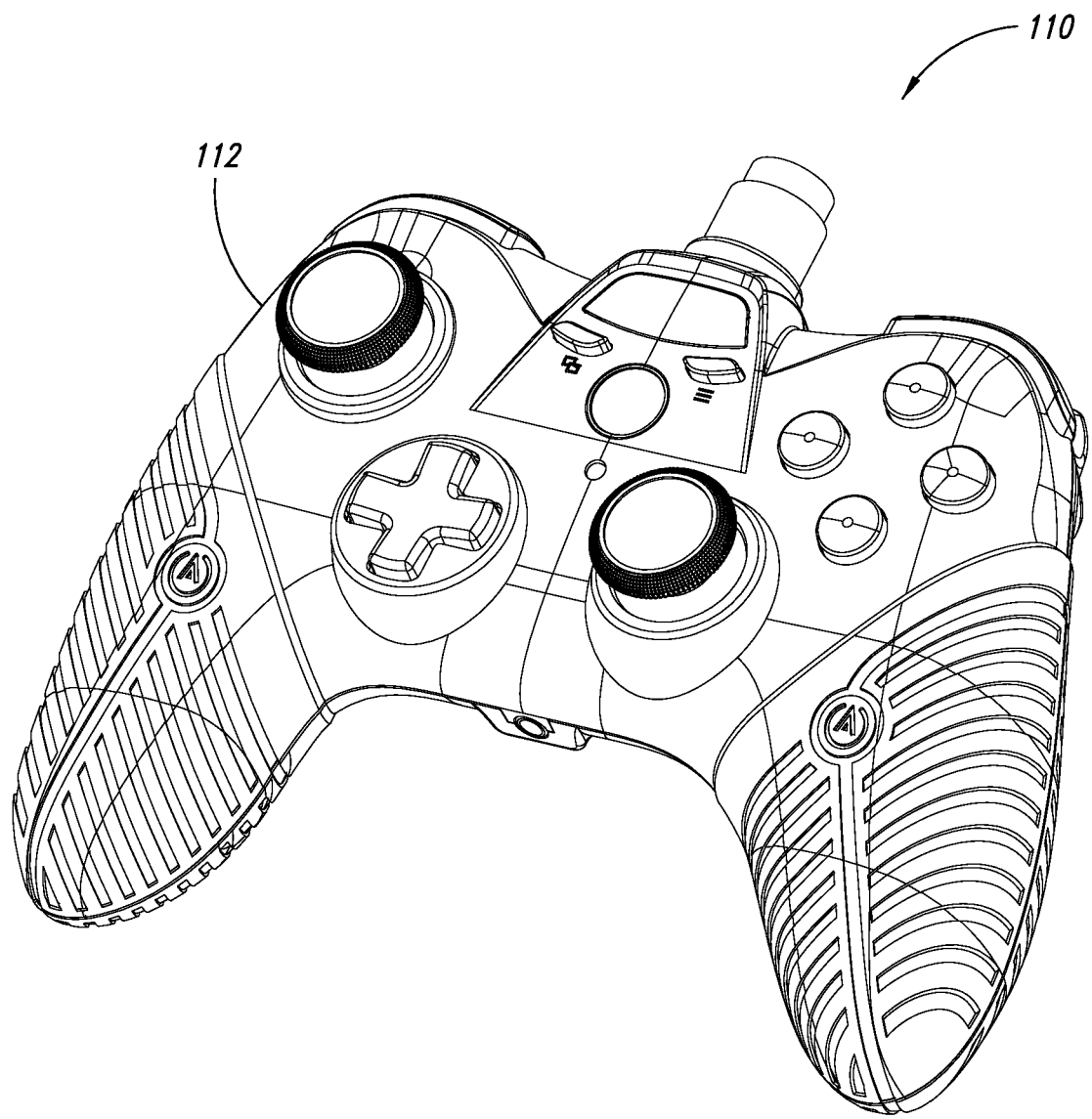
FIG. 3 illustrates a front perspective view of a controller, according to one example, non-limiting implementation.
Figure 4:
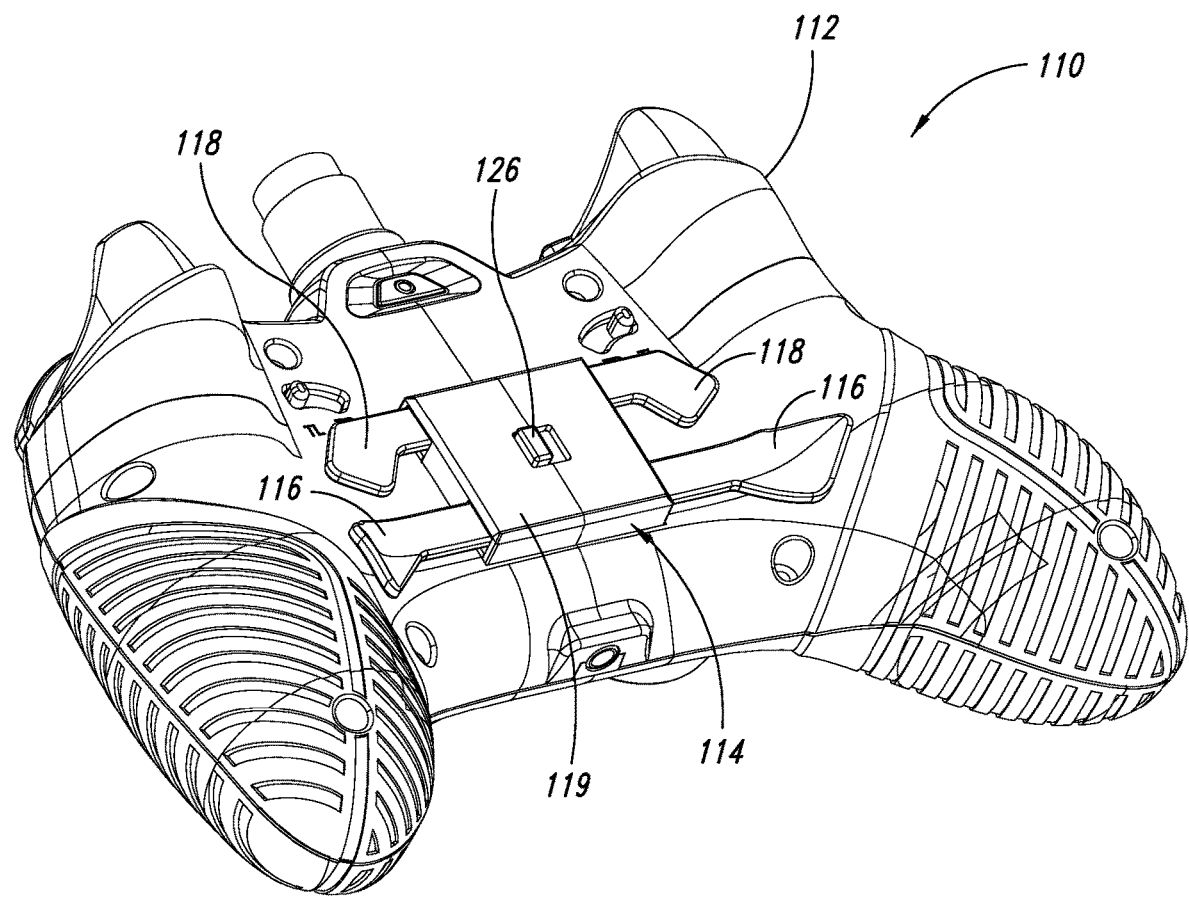
FIG. 4 illustrates a rear perspective view of the controller of FIG. 3.

FIGS. 1-2C illustrate a controller 10 according to one example, non-limiting implementation. The controller 10 includes a controller body 12 and a module member 14. The module member 14 is configured to be removably coupleable to a back side of the controller body 12.

As illustrated in FIGS. 1-2C, the module member 14 includes pairs of paddles or actuators (hereinafter sometimes referred to as "levers") 16, 18 that protrude outwardly from each side of a module member body 19. In particular, FIG. 1 illustrates a rear perspective view of the controller 10, FIG. 2A illustrates a rear plan view of the controller body 12, FIG. 2B illustrates a front plan view of the module member 14, and FIG. 2C illustrates a rear plan view of the module member 14 with certain components (e.g., levers 16, 18) removed for clarity of illustration and description.

Thus, the module member 14 includes a first pair of levers 18 that protrude from a right side of the module member body 19, and a second pair of levers 16 that protrude from a left side of the module member body 19. Each of the first pair and second pair of levers 16, 18 are positioned to be a mirror image of the other relative to a central axis of the module member 14 as they protrude from the respective side of the module member body 19. Unlike conventional controllers which may include controls that are directly connected to a back side of the controller body and extend in a vertical orientation, each of the first and second pair of levers 16, 18 are coupled to the module member body 19 and extend in a horizontal orientation. Further, unlike conventional controllers, the module member 14 includes a processor, for example, in the form of a printed circuit board (PCB) disposed in the module member 14 in lieu of in the controller, which allows for greater flexibility in customizing the user experience by providing, for example, advantageous ergonomic designs, ability to retrofit customized controls into existing controllers, etc.

Further, as illustrated in FIGS. 1-2C, each of the levers 16, 18 has a relatively short length, such that a user can access the levers 16, 18 during use and depress or, more generally, move the levers 16, 18. Each of the levers 16, 18 is coupled to the module member body 19 via corresponding recesses 28 disposed on the corresponding sides of the member body 19. In some implementations, the levers 16, 18 can be coupled to the member body 19 via frictional forces, e.g., frictional fit apertures/recesses disposed in the member body 19, detent systems, welding, fasteners, etc. In some implementations, the levers 16, 18 and the member body 19 can be designed so that the levers 16, 18 are removably and interchangeably coupled to the member body 19. In such implementations, a user can remove one or more of the levers 16, 18 and interchange and/or replace with other levers 16, 18.

The levers 16, 18 are generally configured to allow movement of the levers 16, 18 to activate a control function. For example, as illustrated in FIGS. 1-2C, a distal portion of the levers 16, 18 is generally sized and shaped to be moved by thumbs of a user, which movement can activate the control function. For example, activating the control function can result in controlling an on-screen function, such as navigation, jump, sprint, switch screens, etc. In particular, the module member 14 includes a switch mechanism operably coupled to a processor (e.g., hardware circuitry, e.g., an application specific integrated circuit (ASIC)) disposed in the module member body 19; for example, integrated into a PCB. In some implementations, the processor may be communicatively coupled to a non-transitory processor-readable storage medium that stores processor-executable data and/or instructions. In general, as the levers 16, 18 are moved, such movement causes the levers 16, 18 to activate the switch mechanism. In some implementations, the switch mechanism may take the form of a mechanical switch button which is disposed in the member body 19. In other implementations, the switch mechanism may take other forms, such as electrical switches, wireless switches (e.g., half-effect switch), etc. More particularly, activation of the switch mechanism via the levers 16, 18 causes electrical communication with the processor to generate output signals. Such output signals are communicated to a controller processor to control the on-screen function.

As illustrated in FIGS. 1-2C, the controller body 12 includes a cavity 20 with a plurality of connector pins 21. The module member body 19 also includes a plurality of member connector pins 22. In general, the connector pins 21 disposed on the controller body 12 and the module member body 19 may, in some implementations, take the form of female and male connector pins. Moreover, the connector pins 21, 22 disposed on the controller body 12 and module member body 19, respectively, are generally sized and shaped to align with each other so that the module member body 19 can be electrically and communicatively coupled to the controller body 12. As illustrated in FIGS. 1-2C, the cavity 20 in the controller body 12 is sized and shaped to removably coupleably receive the module member body 19. In particular, as the module member body 19 is received in the controller body 12, the connector pins 22 of the module member body 19 couple to the connector pins 21 in the controller body 12.

Figure 5:
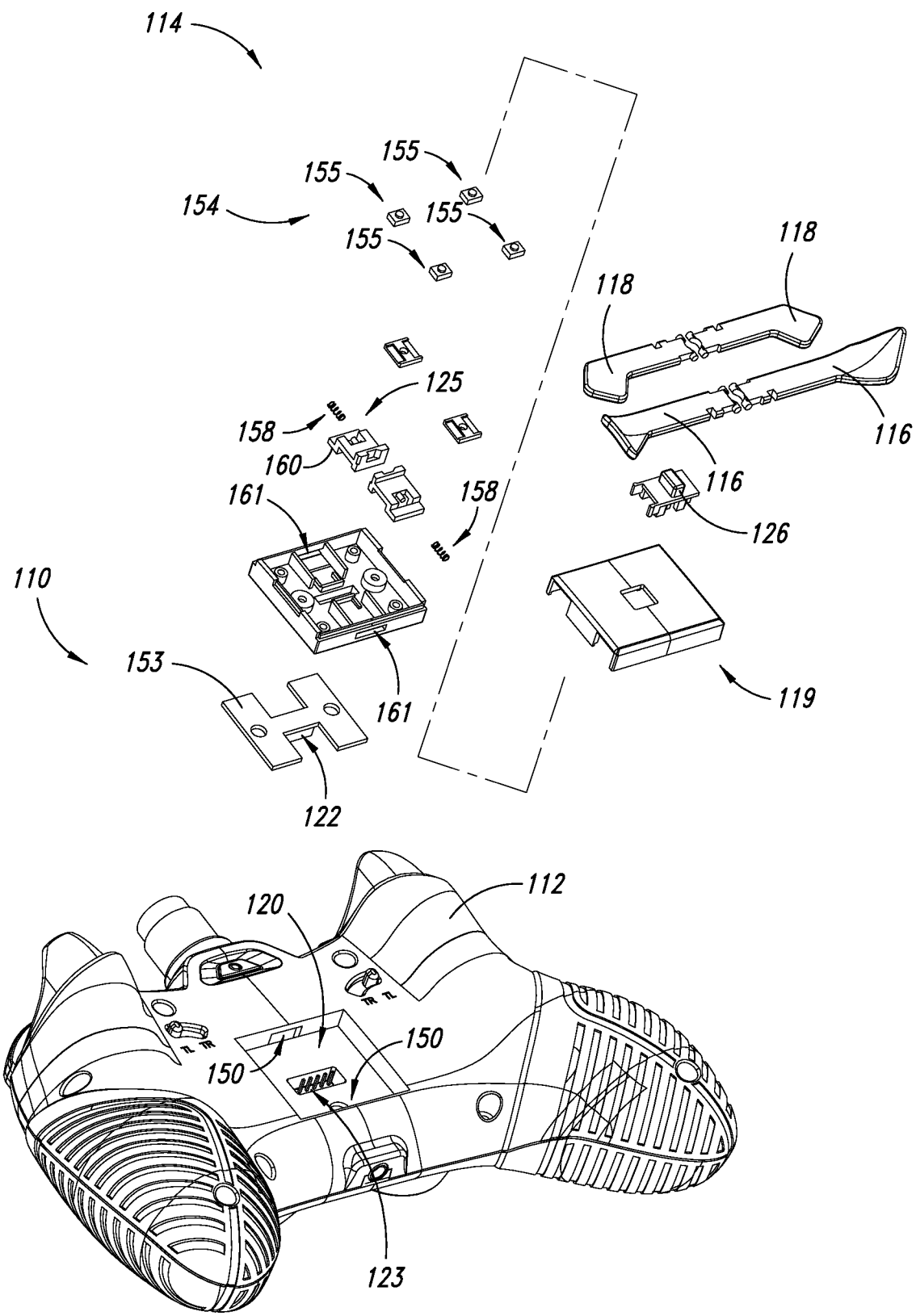
FIG. 5 illustrates a partially exploded view of the controller of FIG. 3.

FIGS. 3-6C illustrate a controller 110 according to one example non-limiting implementation. The controller 110 includes a controller body 112 and a module member 114. The controller 110 is generally similar to the controller 10 illustrated in FIGS. 1-2C, but provides certain variations. The controller body 112 includes a single pin connector 123, e.g., a 5-pin connector, disposed in the connector body 112. In other implementations, however, the single connector 123 may take other forms, such as USB 3.0 A-type, B-Type, Micro or Mini, a 4-pin connector, or other type of connectors. In particular, the pin connector 123 is disposed in a cavity 120 formed in the controller body 112. The cavity 120 is sized and shaped to removably, coupleably receive the module member 114. For example, as illustrated in FIG. 5, the controller body 112 includes a pair of recesses 150 that are sized and shaped to removably secure the module member 114 as described in further detail below.

A module member body 119 of the module member 114 includes a female form of a connector 122 that is sized and shaped to couple to the single connector 123. In other implementations, however, the location of the female connector 122 and the male connector 123 may be reversed, e.g., the module member 114 can include a male connector 123 and the controller body 112 can include a female connector 122.

The module member 114 includes a first pair of levers 118, where each lever 118 protrudes from opposite sides of the module member body 119. Adjacent to the first pair of levers 118, the module member 114 includes a second pair of levers 116, where each lever 116 protrudes from opposite sides of the module member body 119. In this implementation, the first pair of levers 118 protrude a different distance from corresponding sides of the module member body 119 than the second pair of levers 116, and have a generally different shape and profile. Each of the levers 116, 118 can be configured to provide functionality that can be the same or different from each other. For example, one or more of the levers 116, 118 can control a certain on-screen function that is different from the other. In addition, as described above, in some implementations, the module member body 119 can be configured to interchangeably coupleably receive the levers 116, 118, or any other lever.

Figure 6A:
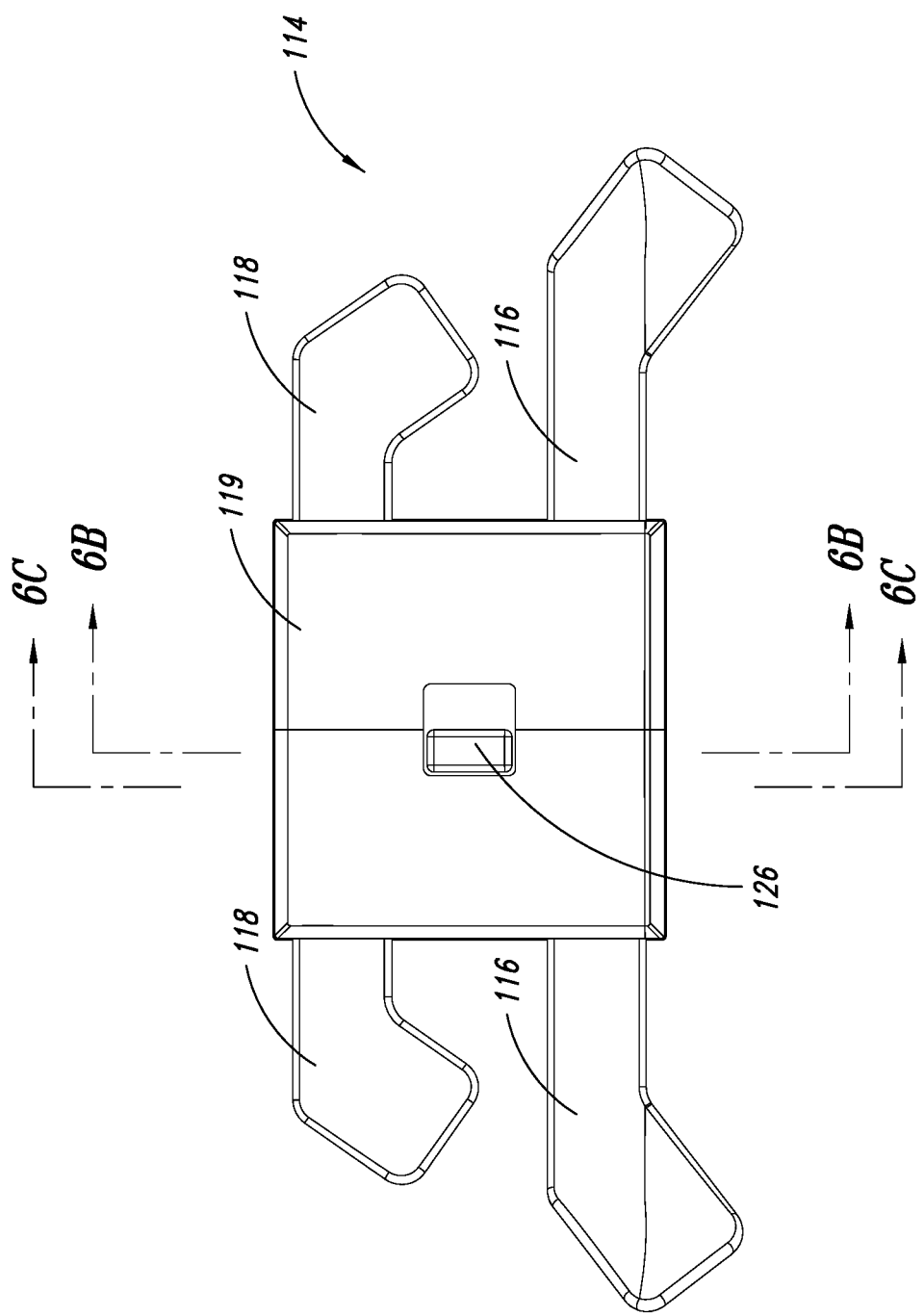
FIG. 6A illustrates a plan view of a module member of the controller of FIG. 3, according to one example, non-limiting implementation.
Figure 6B:
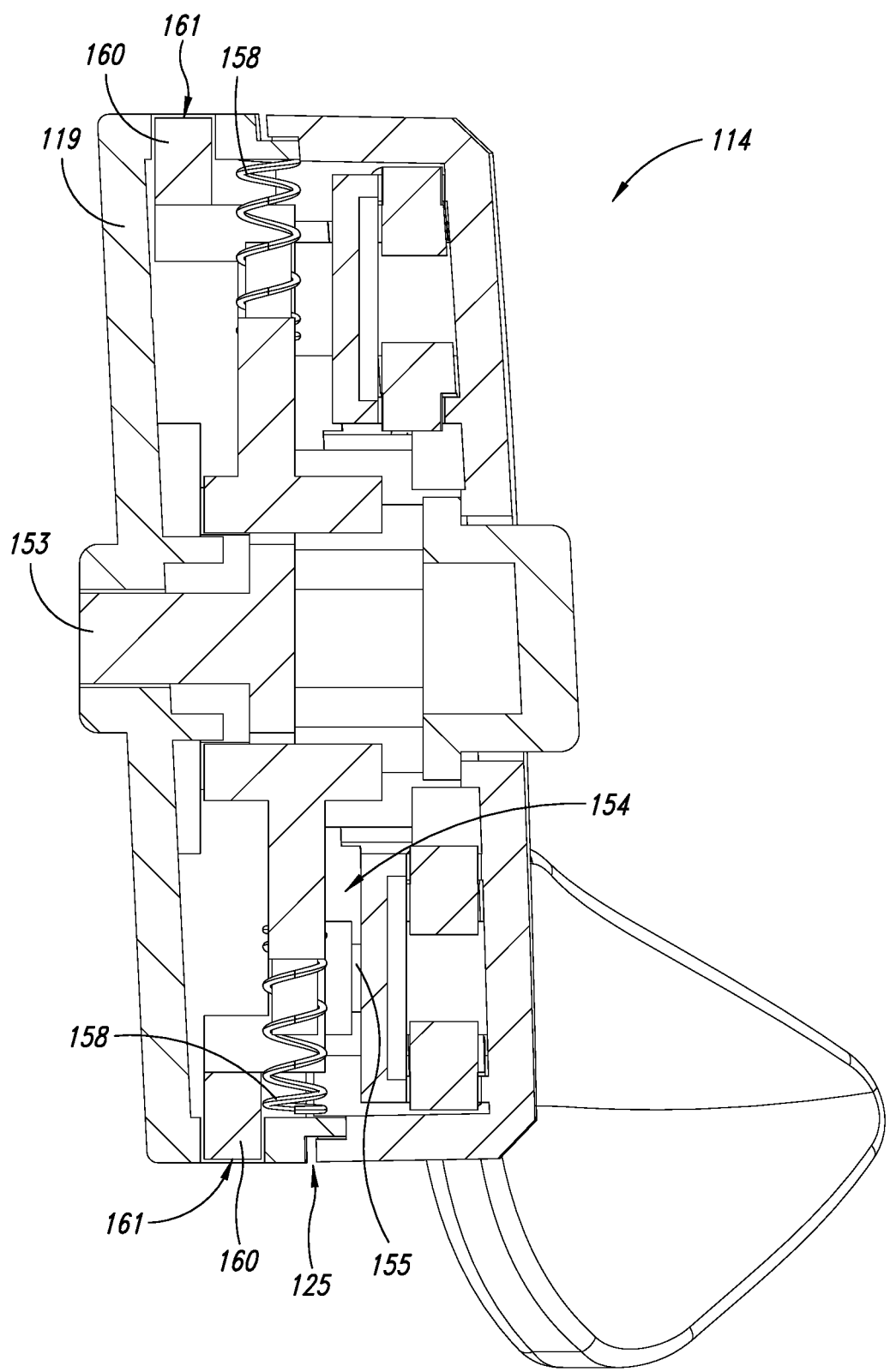
FIG. 6B illustrates a cross-sectional view of the module member of FIG. 3, taken along lines 6B-6B.
Figure 6C:
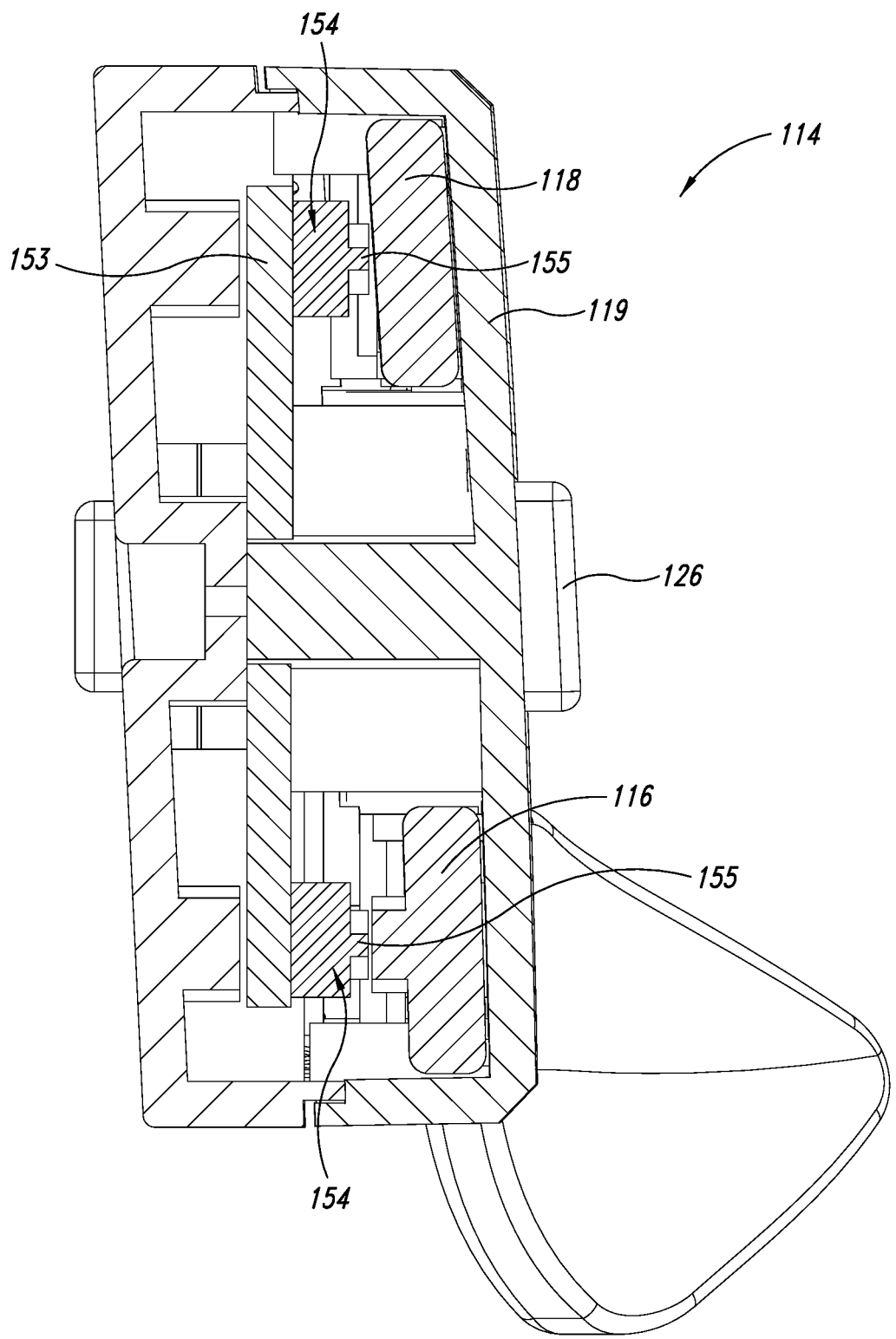
FIG. 6C illustrates a cross-sectional view of the module member of FIG. 3, taken along lines 6C-6C.

Further, as illustrated in FIGS. 5 through 6C, for example, the module member 114 includes a PCB 153 disposed in the module member body 119, with the connector pin 122 protruding outwardly therefrom. The module member 114 also includes a switch mechanism 154 disposed in the module member body 119 and positioned adjacent to each of the first and second pair of levers 116, 118. In particular, in this implementation, the switch mechanism 154 takes the form of mechanical switch buttons 155. Each of the mechanical switch buttons 155 are positioned adjacent to the corresponding first and second pair of levers 116, 118 and the PCB 153. Thus, as the levers 116, 118 are moved, such movement activates the switch mechanism 154 by contacting the mechanical switch buttons 155, which causes electrical communication with the PCB 153 to generate output signals. As described above, such output signals are communicated to a controller processor to control the on-screen function.

The module member 114 also includes a locking mechanism 125. The locking mechanism 125 is operable via a slideable projection 126 that slides between locking and unlocking positions to secure and unsecure the module member 114 when coupled to the controller body 112. For example, in some implementations, the locking mechanism 125 can operate to secure and/or unsecure the female connector 122 disposed in the module member body 119 to the single connector 123 disposed in the controller body 112. In some implementations, the locking mechanism 125 can include one or more biasing mechanisms 158, e.g., springs, that are coupled to the slideable projection 126 and corresponding tabs 160. The tabs 160 in the locking position protrude outwardly from the module member body 119 via corresponding apertures 161 disposed in the module member body 119, and are sized and shaped to be coupleably received in the recesses 150 of the controller body 112. The biasing mechanism(s) 158 is configured to bias the tab(s) 160 toward the locking position. As the slideable projection 126 is slideably moved, such movement overcomes the biasing forces exerted by the biasing mechanism(s) 158 to move the tab(s) 160 to an interior of the module member body 119 away from the recesses 150 in the controller body 112, to unsecure the module member 114. In some implementations, the biasing mechanism 158 can be configured to bias or urge the tab(s) 160 toward a locking or unlocking position. For instance, slideable movement of the slideable projection 126 can cause the tab(s) 160 to protrude outwardly from the aperture 161 in a locking position with the biasing mechanism 158 urging or biasing the tab(s) 160 to remain in the locking position. Conversely, slideable movement of the slideable projection 126 in an opposite direction can cause the tab(s) 160 to move inwardly into the module member body 119 with the biasing mechanism 158 urging or biasing the tab(s) 160 to remain in such an unlocking position.

Figure 7:
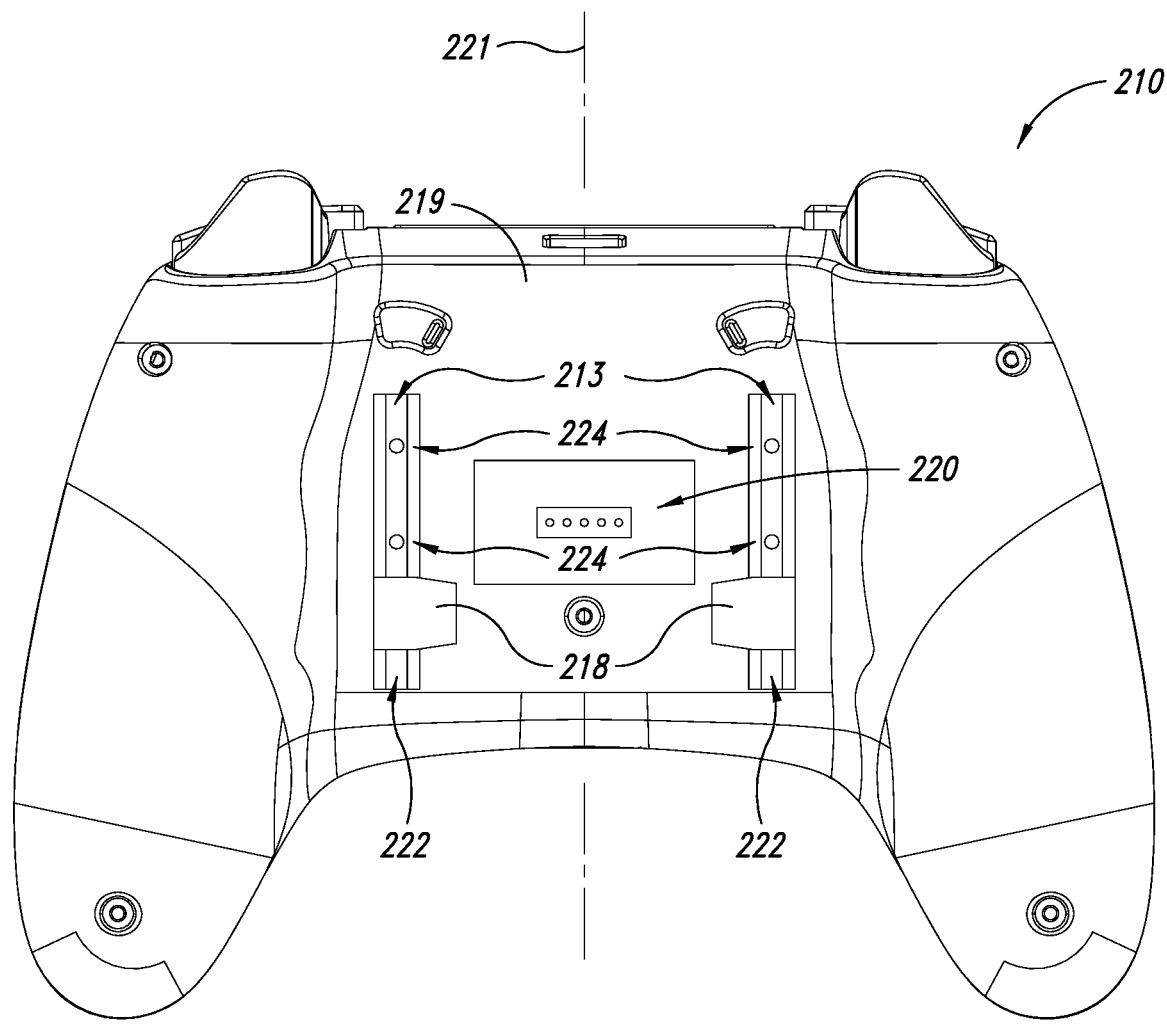
FIG. 7 illustrates a perspective view of a controller, according to one example, non-limiting implementation.
Figure 7A:
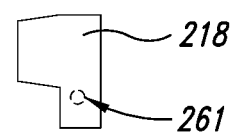
FIG. 7A illustrates a perspective view of an actuator of the controller of FIG. 7, according to one example, non-limiting implementation.

FIG. 7 illustrates a rear view of a controller 210, according to one example, non-limiting implementation. FIG. 7A illustrates a detailed plan view of a lever or actuator 218 that is coupleable to the controller 210. The controller 210 provides a variation in which one or more actuators 218 are slideably moveable between one or more positions. In particular, the controller 210 includes one or more guide rails 213 positioned along a rear portion of a controller body 219. In some implementations, the controller 210, as illustrated in FIGS. 7 and 7A, can include a pair of guide rails 213 spaced apart relative to a central axis 221 of the controller 210 and fixedly coupled to the controller body 219. Each guide rail 213 is sized and shaped to define a guide channel 222 along which the one or more actuators 218 can be slideably moveable between various positions. As illustrated in FIGS. 7 and 7A, the controller 210 can include one or more actuators 218 in lieu of or in addition to the various implementations of the module members described herein. For example, as illustrated in FIG. 7, the controller body 219 can include a cavity 220, which may removably coupleably receive a module member.

Each guide rail 213 includes a locking mechanism that can lock or secure the one or more actuators 218 in one or more use positions. In each of the one or more use positions, as the one or more actuators 218 are secured into the corresponding use positions via the locking mechanism, such can generate electrical communication with a processor of the controller 210 to generate output signals. Such output signals are communicated to the processor of the controller 210 to control the on-screen function.

For example, in some implementations, each guide rail 213 can include one or more openings 224 which are sized and shaped to provide access to corresponding electrical contacts disposed in the controller body 219, for example, female forms of electrical contacts. The one or more actuators 218 can include a male form of an electrical contact; for example, a connector pin 261. The one or more actuators 218 can include a biasing mechanism, e.g., a spring, which biases the male form of the electrical contact 261 toward the one or more openings 224. Thus, as the one or more actuators 218 are slideably moved along the corresponding guide rail 213, the biasing mechanism can cause the male form of the electrical contact to engage the one or more openings 224 and secure the one or more actuators 218 in the one or more positions. For example, FIG. 7 illustrates a variation in which each guide rail 213 has three longitudinally spaced apart openings 224. The three openings 224, therefore, define three distinct positions for the one or more actuators 218 along each guide rail 213. As the one or more actuators 218 are secured into the one or more positions, the male form of the electrical contact 261 engages with the female form of the electrical contact disposed in the controller body 219 to generate electrical communication discussed above.

In operation, therefore, the user can slideably individually or concurrently move the one or more actuators 218 to a desirable use position. As the one or more actuators 218 are slideably moved along the corresponding guide rails 213, the locking mechanism allows the one or more actuators 218 to be secured in the desirable use position and generate electrical communication to control the on-screen function. The user can thereafter manipulate a portion of the one or more actuators 218; such manipulation can control the on-screen function. While FIGS. 7 and 7A illustrate one implementation of the locking mechanism described above, in other implementations, the guide rails 213 can include alternative locking mechanisms of guide rails known in the art. Further, the one or more actuators 218 illustrated in FIGS. 7 and 7A can take a wide variety of alternative shapes and forms.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:
1. A controller comprising:
a controller body having:
a front side;
one or more game control inputs that extend outwardly from the front side;
a back side that is opposite to the front side; and a cavity disposed in the back side of the controller body;

a module member that is physically distinct and separate from the controller body removably coupleable to the controller body, the module member having a member body sized and shaped to be received in the cavity, wherein the module member includes a processor disposed in the member body; and at least one actuator that protrudes from a side of the member body, the processor of the module member operably coupleable to the at least one actuator.

2. The controller of claim 1, further comprising:
a pair of actuators, each actuator protruding outwardly from opposing sides of the member body.

3. The controller of claim 1 wherein the module member includes:
a printed circuit board disposed in the member body; and
a switch mechanism disposed in the member body, the switch mechanism configured to be activated by movement of the at least one actuator, movement of the at least one actuator coupling the at least one actuator with the printed circuit board.

4. The controller of claim 3 wherein the switch mechanism is sandwiched between the at least one actuator and the printed circuit board.

5. The controller of claim 1 wherein the controller body includes a male connector and the member body includes a female connector that is sized and shaped to couple the member body to the controller body.

6. The controller of claim 1, further comprising:
a locking mechanism disposed in the member body, the locking mechanism configured to removably secure the member body to the controller body.

7. The controller of claim 6 wherein the locking mechanism includes at least one biasing mechanism coupled to a tab, the at least one biasing mechanism configured to bias the tab to a locking position such that the tab protrudes outwardly from the member body.

8. The controller of claim 1, wherein the controller body includes a top side, a bottom side, a right side, and a left side, the cavity which receives the module member having an outer periphery which is spaced apart from the top, bottom, left, and right sides of the controller body.

9. The controller of claim 1, wherein the module member includes a top side, a bottom side, a right side, and a left side, the at least one actuator protruding from either the left side or the right side.

10. A controller comprising:
a controller body;
a module member that is physically separate and distinct from the controller body, the module member removably coupled to the controller body and including:
a module member body;
a first pair of levers that protrude outwardly from opposing sides of the module member body;
a second pair of levers that protrude outwardly from the opposing sides of the module member body; and
a processor disposed in the module member body and coupleable to the first and second pair of levers.

11. The controller of claim 10, further comprising:
a plurality of mechanical switch buttons, each one of the mechanical switch buttons disposed in the module member body and arranged to be positioned adjacent to the corresponding first and second pair of levers.

12. The controller of claim 11 wherein each one of the mechanical switch buttons is sandwiched between the processor and the corresponding first and second pair of levers.

13. The controller of claim 10, further comprising:
a locking mechanism that removably secures the module member body to the controller body.

14. The controller of claim 13 wherein the locking mechanism includes at least one biasing mechanism coupled to a tab, the at least one biasing mechanism configured to bias the tab to a locking position such that the tab protrudes outwardly from the module member body.

15. The controller of claim 10 wherein the controller body includes a cavity that is sized and shaped to removably coupleably receive the module member body.

16. The controller of claim 15 wherein the cavity of the controller body includes a male connector and the module member body includes a female connector, the male connector and the female connector configured to electrically couple the module member body with the controller body.

17. A controller comprising:
a controller body;
one or more actuators removably coupled to the controller body, movement of the one or more actuators controlling an on-screen function, wherein the one or more actuators are slideably directly coupled to the controller body, wherein the one or more actuators are slideably moveable between at least two positions; and
a guide rail sized and shaped to receive the one or more actuators, the one or more actuators slideably moveable between the at least two positions via the guide rail.

18. A controller comprising:
a controller body having:
a front side;
one or more game control inputs that extend outwardly from the front side;
a back side that is opposite to the front side; and
a cavity disposed in the back side of the controller body;
a module member that is physically distinct and separate from the controller body removably coupleable to the controller body, the module member having a member body sized and shaped to be received in the cavity;
at least one actuator that protrudes from a side of the member body; and
a locking mechanism disposed in the member body, the locking mechanism configured to removably secure the member body to the controller body, wherein the locking mechanism includes at least one biasing mechanism coupled to a tab, the at least one biasing mechanism configured to bias the tab to a locking position such that the tab protrudes outwardly from the member body.

19. A controller comprising:
a controller body having:
a front side;
one or more game control inputs that extend outwardly from the front side;
a back side that is opposite to the front side; and
a cavity disposed in the back side of the controller body;
a module member that is physically distinct and separate from the controller body removably coupleable to the controller body, the module member having:
a member body sized and shaped to be received in the cavity;
a printed circuit board disposed in the member body; and
a switch mechanism disposed in the member body, the switch mechanism configured to be activated by movement of the at least one actuator, movement of the at least one actuator coupling the at least one actuator with the printed circuit board; and at least one actuator that protrudes from a side of the member body.

\* \* \* \* \*